United States Patent [19]

Garfinkle

[11] Patent Number: 5,414,225
[45] Date of Patent: May 9, 1995

[54] MOBILITY-DISABLED PORTABLE WEIGHING DEVICE

[76] Inventor: Moishe Garfinkle, P.O. Box 15855, Philadelphia, Pa. 19103

[21] Appl. No.: 58,954

[22] Filed: May 7, 1993

[51] Int. Cl.$^6$ .............. G01G 19/00; G01G 21/28; G01G 3/14
[52] U.S. Cl. .................. 177/199; 177/127; 177/211
[58] Field of Search .............. 177/126–127, 177/211, 262, 199

[56] References Cited

U.S. PATENT DOCUMENTS

| | | | |
|---|---|---|---|
| 3,732,938 | 5/1973 | Nelson | 177/126 |
| 3,961,675 | 6/1976 | Siegel | 177/126 |
| 4,475,610 | 10/1984 | Schwarzchild | 177/211 |
| 4,711,313 | 12/1987 | Iida et al. | 177/127 |
| 4,765,421 | 8/1988 | Newton et al. | 177/127 X |
| 4,802,540 | 2/1989 | Grabovac et al. | 177/211 |

Primary Examiner—George H. Miller, Jr.

[57] ABSTRACT

A portable weighing device comprising two laterally displaced, electrically connection and rigidly aligned weighing modules is disclosed that permits convenient weighing of the mobility-disabled while occupying a conventional manually-operated wheelchair supported by two front caster wheels and two rear main wheels. The portions of the weight of the wheelchair supported by each wheel is successively summed and the tare is electronically subtracted. The weight of the occupant is then displayed. Accordingly with the weighing device wheelchair users can be conveniently weighted at rehabilitation centers, physician's offices or hospital clinics, or alternatively can weight themselves at their residence. The weighing device can be folded for carriage or storage.

12 Claims, 6 Drawing Sheets

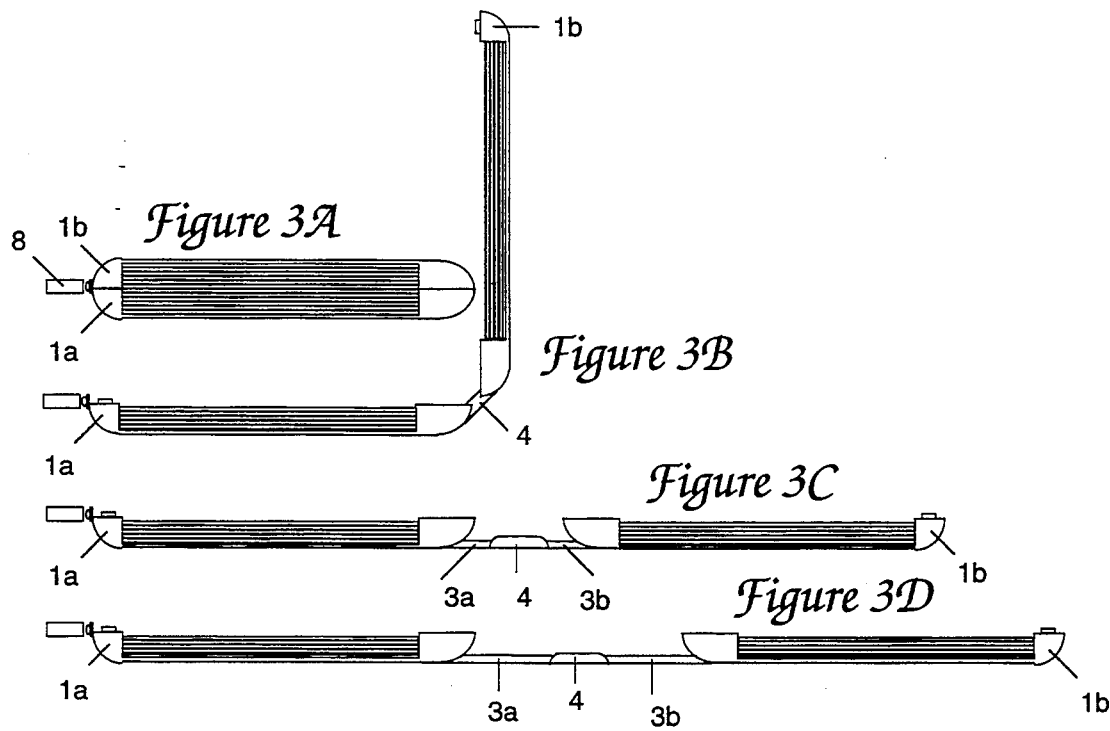
Figure 3A
Figure 3B
Figure 3C
Figure 3D
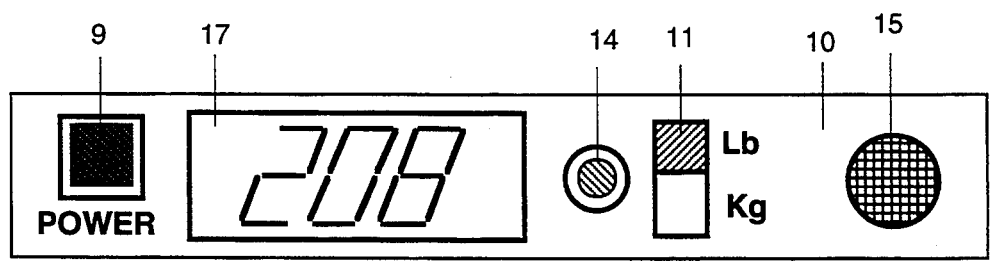
Figure 4
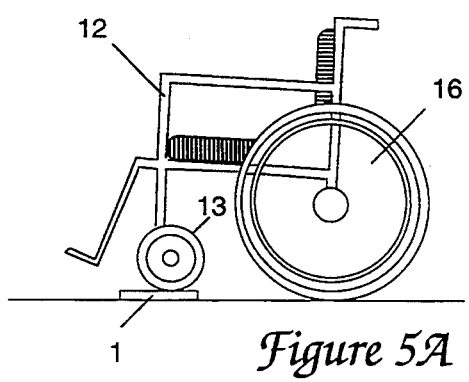
Figure 5A
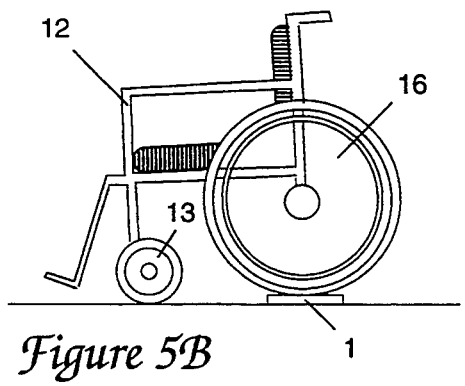
Figure 5B

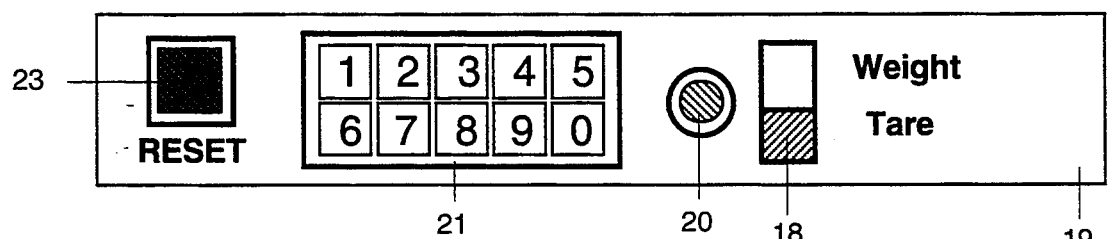
Figure 6
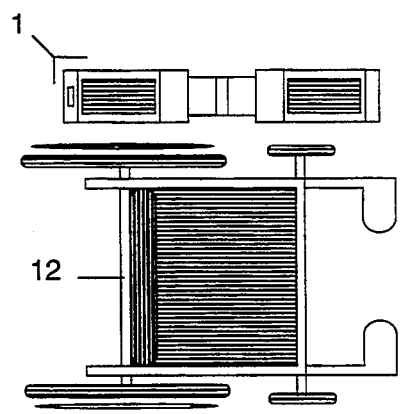
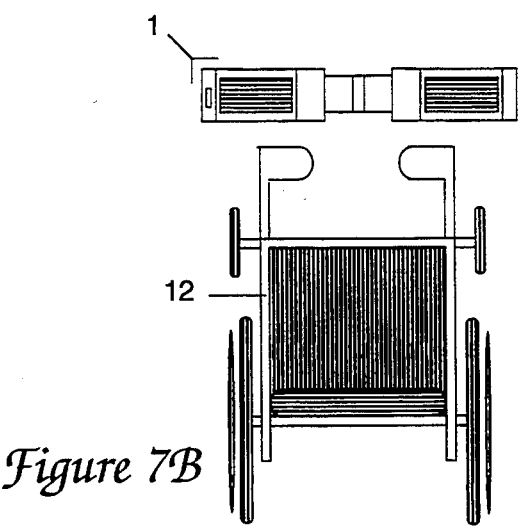
Figure 7A    Figure 7B
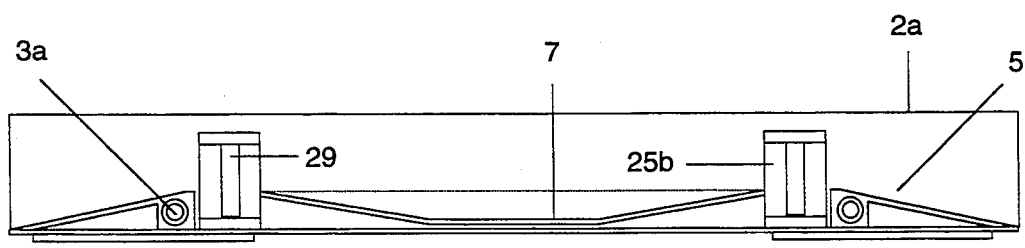
Figure 10

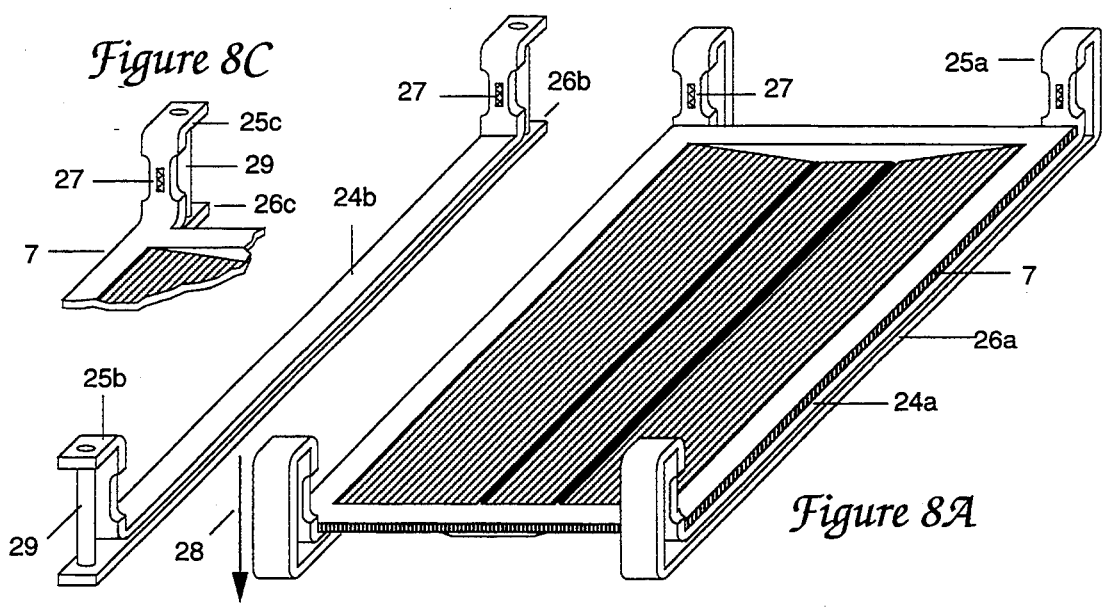
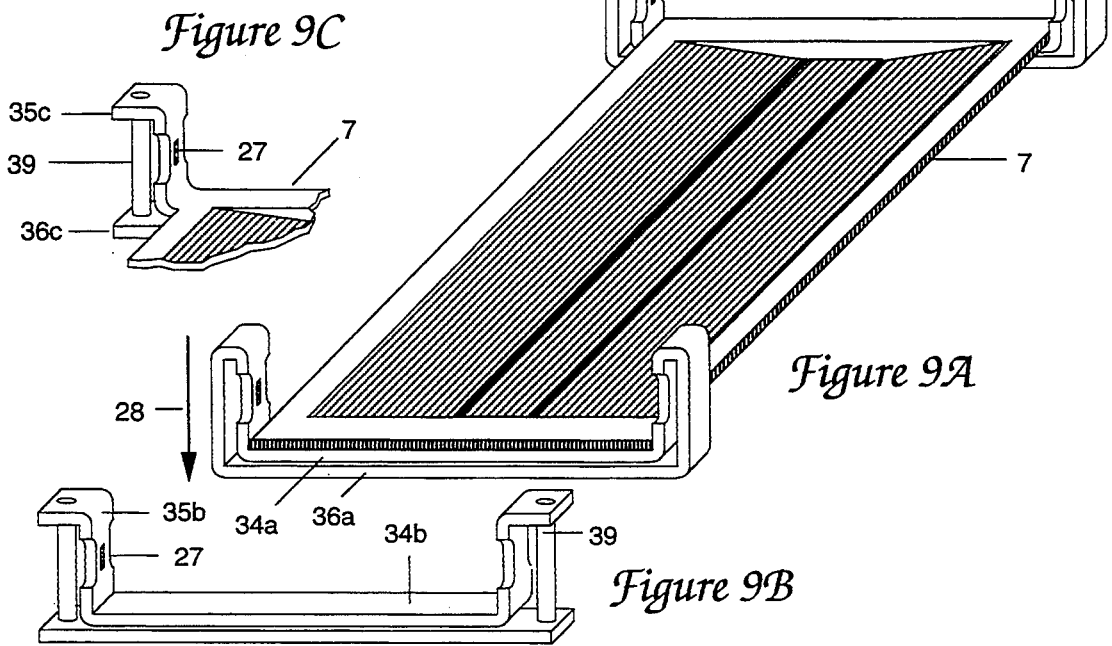

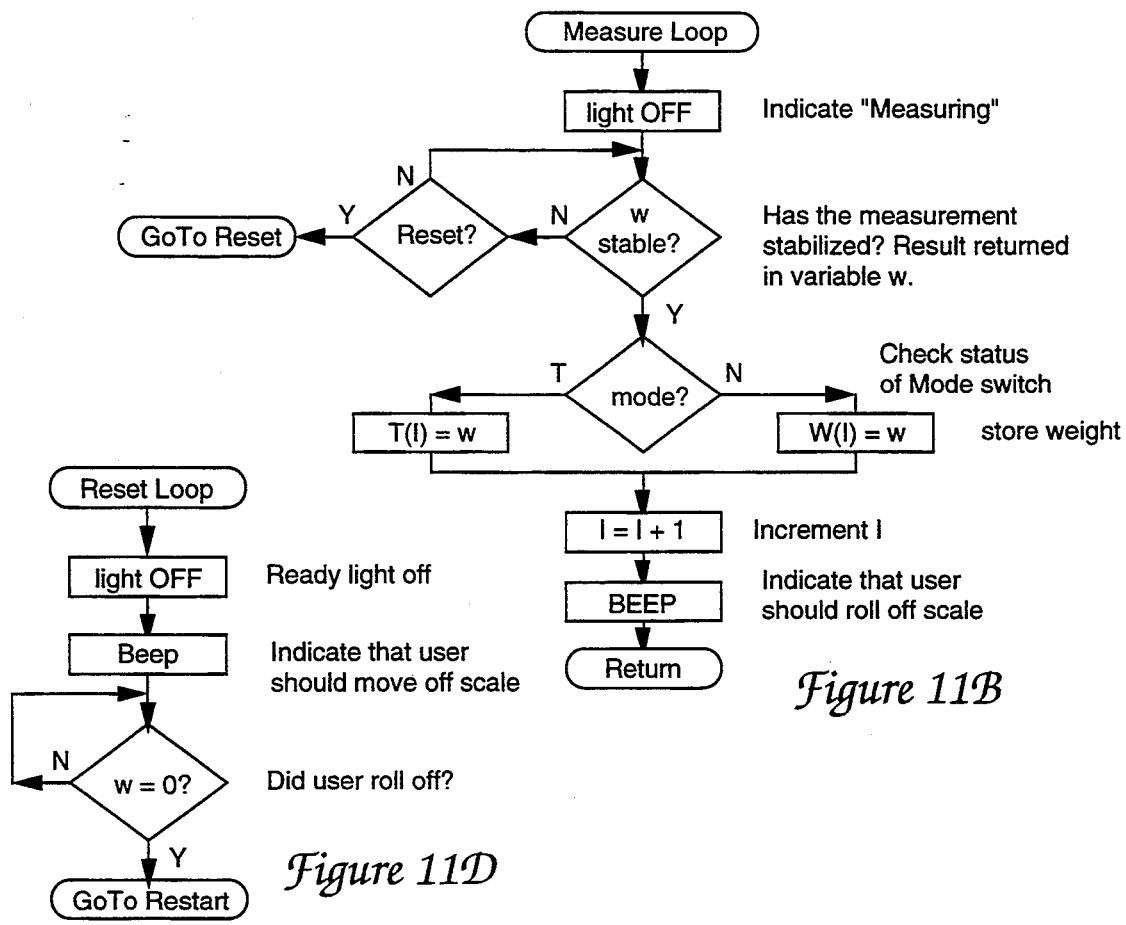
Figure 11B
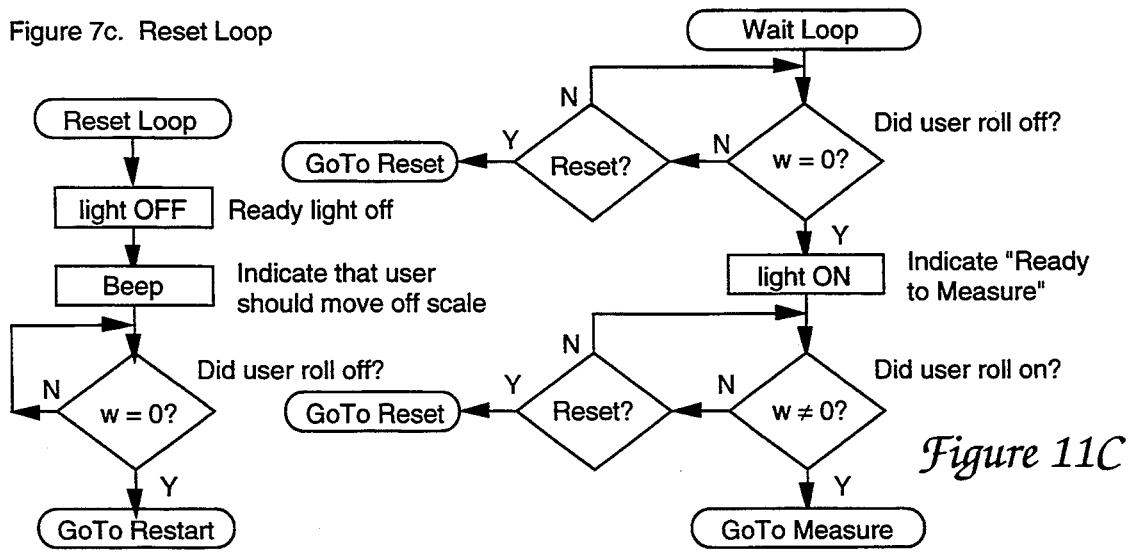
Figure 7c. Reset Loop
Figure 11D
Figure 11C

MOBILITY-DISABLED PORTABLE WEIGHING DEVICE

BACKGROUND OF THE INVENTION

The number of mobility-disabled in America is now well over two million of which almost 1½ million are confined to wheelchairs. Although such persons are health-conscious even simple medical procedures such as weighing themselves can become quite difficult at their residences. Such an ostensibly simple procedure can be in fact quite involved because the weighing device must accommodate the wheelchair, which generally requires ramps and a platform scale. As such wheelchair users ordinarily can only be weighed at a physician's office or clinic with a platform scale, which is rarely more than once a month. Such infrequent weighings renders weight control programs quite difficult to maintain. In addition to those using wheelchairs, often those requiting crutches or walkers must be seated in wheelchairs for weighing as they have difficulty balancing themselves on ordinary scales.

Because of their size platform scales are generally found only in clinics with a significant number of mobility-disabled patients, such as rehabilitation centers. Consequently, physicians rarely have office platform scales, not only because such scales occupy such a disproportionate amount of floor space in relation to their usage, but even with foldable ramps, such scales occupy valuable storage space. Hence, the mobility-disabled must often travel further distances than necessary to equipped clinics for even routine medical treatments inasmuch as such treatments generally includes weight measurements. Although physician's weighing chairs are available with built-in scales, those confined to wheelchairs find it inconvenient and even annoying to have to be transferred from one chair to another and then back for a procedure as routine as weighing.

In terms of those facing this problem the number of the wheelchairs users in America has almost doubled from some 720,000 in 1980 to over 1,400,000 in 1990 during a decade in which the general population had increased only 10%. Moreover, this utilization figure does not take into account users of crutches and walkers, which altogether number well over 2,000,000, most of whom require special aids in weighing.

Not only are the number of wheelchair users increasing, but the largest number of wheelchair users are the elderly, the fastest growing segment of our population. This group should continue to increase faster than the general population for the foreseeable future.

OBJECTIVE OF THE INVENTION

In response to the deficiencies inherent in available weighing systems for the mobility disabled the portable weighing device comprising two laterally displaced, electrically connected and rigidly aligned weighing modules illustrated in FIGS. 1A and 1B is disclosed which permits convenient wheelchair weighing of the disabled. The weighing device is designed for the conventional manually-operated wheelchair supported by two front caster wheels and two rear main wheels.

FIG. 1A shows the weighing device deployed. The caster wheels are first rolled up the integral ramps onto the concave weighing platform followed by the main wheels. The portions of the weight of the wheelchair supported by each wheel is successively summed and the tare is electronically subtracted. The weight of the occupant is then displayed.

FIG. 1B shows the weighing device folded for carriage or storage. Accordingly with the weighing device wheelchair users can be conveniently weighted at rehabilitation centers, physician's offices or hospital clinics, or alternatively can weight themselves at their residence.

Conventional wheelchairs are quite diverse with respect to dimensions however, differences in which ostensibly could affect weight readings. The three dimensions which are critical are the wheelbase (longitudinal distance between caster and main wheel axes), center-of-gravity (vertical distance between center of occupied wheelchair mass and floor level), and the tread (lateral distance between each of the caster wheels and between each of the mail wheels). The effect of different wheelbases and different centers-of-gravity on weight readings depend on the tilt of the wheelchair when either the caster wheels or the main wheels are on the scale platform. However, if the height of the scale platform above floor level is less than a roughly 4 millimeters (0.16 inches) clearance tilt errors can be discounted on weight readings, cumulatively accounting for no more than a 0.75% error in weight readings for conventional wheelchairs, but only if the two laterally displaced weighing modules are rigidly aligned.

Ordinary scales are significantly affected by the position of the imposed weight on the weighing platform. Because of the requirement to accommodate wheelchairs with a considerable diversity of tread dimensions the effect of tread differences is acerbated by the wide weighing platforms required. This requirement is met by a novel weighing platform suspension disclosed herein whose weight readings are independent of imposed-weight position and which is linear over the entire range of weight readings.

Accordingly this simple portable battery-powered weighing device would be attractive to two distinct sectors: health-care providers and home-care users. To meet the requirements of health-care providers at hospital clinics, physicians offices, nursing homes and rehabilitation centers the portable weighing device is designed to accommodate a variety of wheelchair sizes, types and styles; be operable by an ordinary medical technician; and require a minimum of floor and storage space. For home-care users the weighing device is designed to be deployable, operable and retrievable from a wheelchair; and be foldable into light, compact package.

BRIEF DESCRIPTION OF THE DRAWINGS

FIG. 3A illustrates the weighing device in elevation folded for storage.

FIG. 3B illustrates the weighing device in elevation partially deployed.

FIG. 3C illustrates the weighing device in elevation partially extended.

FIG. 3D illustrates the weighing device in elevation fully extended.

FIG. 4 illustrates the weighing device weight-reading control panel.

FIG. 5A illustrates the weighing of wheelchair load supported by caster wheels.

FIG. 5B illustrates the weighing of wheelchair load supported by main wheels.

FIG. 6 illustrates the weighing device tare-reading control panel.

FIG. 7A illustrates the deployment of weighing device by home-care user.

FIG. 7B illustrates the wheelchair maneuver for weighing by home-care user.

FIG. 8A illustrates first lateral embodiment of platform suspension.

FIG. 8B illustrates second lateral embodiment of platform suspension.

FIG. 8C illustrates third lateral embodiment of platform suspension.

FIG. 9A illustrates first longitudinal embodiment of platform suspension.

FIG. 9B illustrates second longitudinal embodiment of platform suspension.

FIG. 9C illustrates third longitudinal embodiment of platform suspension.

FIG. 10 illustrates the weighing platform clearance.

FIG. 11B illustrates the microprocessor measure loop subroutine.

FIG. 11C illustrates the microprocessor wait loop subroutine.

FIG. 11D illustrates the microprocessor reset loop subroutine.

Electronic cables, integrated circuitry, and strain-gauge details are not described as they are known to those knowledgeable in the art.

PREFERRED EMBODIMENT OF THE INVENTION

Figures 1A, 1B:
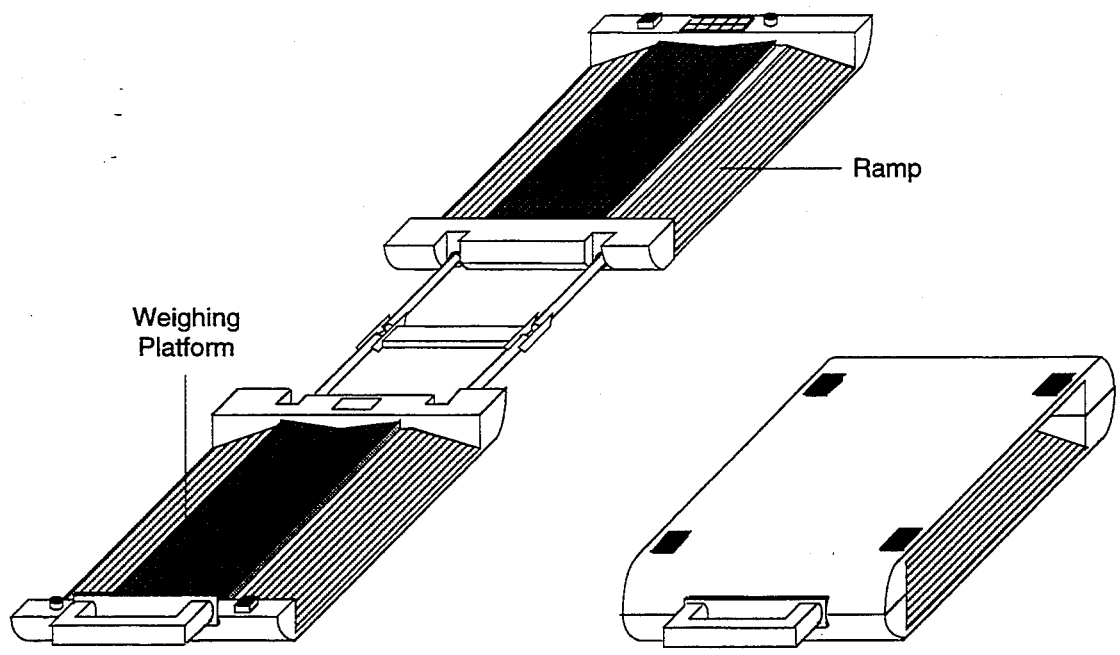
FIG. 1A illustrates the mobility-disabled weighing device deployed.
FIG. 1B illustrates the mobility-disabled weighing device folded.
Figure 2A:
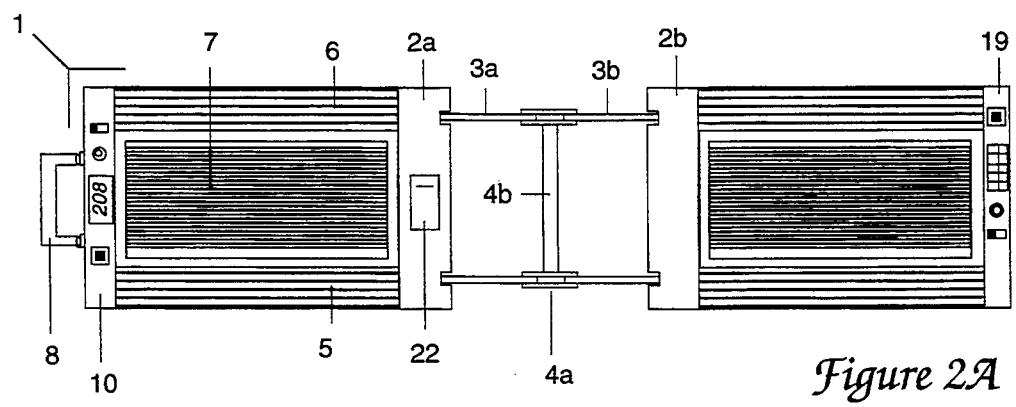
FIG. 2A illustrates the platform of the mobility-disabled weighing device.
Figure 2B:
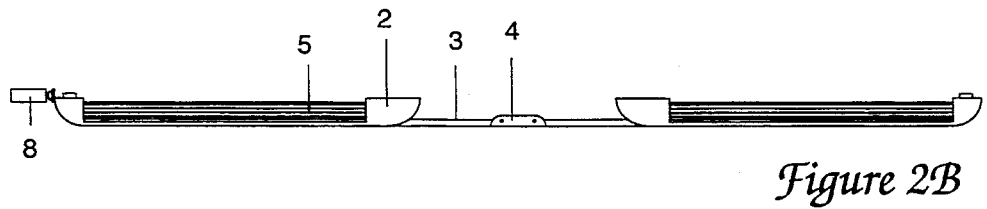
FIG. 2B illustrates the mobility-disabled weighing device in elevation.

FIGS. 2A and 2B illustrate the preferred embodiment of the mobility-disabled weighing device 1. The two weighing modules 2a and 2b are electrically connected, slidably secured and laterally aligned by lateral hollow slide rods 3a and 3b respectively. Rods 3a and 3b are secured to pivot members 4a that is rigidly secured to cross-bar 4b, permitting aligned modules 2a and 2b to be either displaced along rods 3a and 3b by extension of rods 3a and 3b for deployment or folded against one another by retraction of said rods 3a and 3b. After proper deployment of weighing device 1 ramps 5 on each module 2a and 2b allow wheelchairs to be readily rolled onto essentially concave weighing platforms 7 on each module 2a and 2b. Similarly ramps 6 on each module 2a and 2b allow wheelchairs to be readily rolled off of weighing platforms 7 on each module 2a and 2b.

The folded and latched weighing device 1 shown in FIG. 3A can be conveniently carried by handle 8. The case is unlatched and unfolded as shown in FIG. 3B, which is accommodated by pivot member 4. Modules 2a and 2b are laid flat on an essentially level floor as shown in FIG. 3C and then displaced along rods 3a and 3b as shown in FIG. 3D.

For a weight determination after the weighing device 1 has been deployed the device 1 is activated by depressing illuminated power switch 9 on control panel 10 shown in FIG. 4 subsequent to the selection of desired load units by slide switch 11.

As shown in FIG. 5A the wheelchair 12 with occupant is rolled up ramps 5 on each module 2a and 2b until the caster wheels 13 come to rest on the weighing platforms 7 on each module 2a and 2b. After the load supported by the caster wheels 13 has been registered by the weighing platforms 7 on each module 2a and 2b indicator lamp 14 lights and buzzer 15 sounds until the caster wheels 13 are rolled off the weighing platforms 7 on each module 2a and 2b and down ramps 6 on each module 2a and 2b.

As shown in FIG. 5B the wheelchair 12 with occupant is then rolled up ramps 5 on each module 2a and 2b until the main wheels 16 come to rest on the weighing platforms 7 on each module 2a and 2b. After the load supported by the main wheels 16 has been registered by the weighing platforms 7 on each module 2a and 2b green indicator lamp 14 again lights and buzzer 15 again sounds until the main wheels 16 are rolled off the weighing platforms 7 on each module 2a and 2b and down ramps 6 on each module 2a and 2b. The loads supported by castor wheels 13 and by main wheels 16 are summed, the tare weight subtracted, and the weight of the wheelchair occupant shown digitally by display 17.

The weighing device 1 is tared by either of two methods. When TARE is selected on slide switch 18 on control panel 19 as shown in FIG. 6 the red indicator lamp 20 lights and either an empty wheelchair is then rolled across the weighing device in an identical manner as was an occupied wheelchair, or alternatively the tare is keyed in using keypad 21. In both cases the tare is shown digitally by display 17 until WEIGHT is again selected on slide switch 18. The tare weight is then held in memory until altered.

Because weighing requires a sequence of steps, if this sequence is interrupted a valid weight reading will not be made. Consequently, if such an interruption occurs preventing the second reading from being taken immediately following the first the reset switch 23 is depressed to restore the initial conditions required for a first reading.

For home-care use the weighing device 1 must be deployable by the occupant of wheelchair 12. FIGS. 7A and 7B illustrate a simple procedure for doing so. The weighing device 1 is deployed at the side of the wheelchair 12 and the wheelchair is then maneuvered across the weighing device 1 in the manner illustrated in FIG. 5. The self-weighing procedure is practical because the weight and tare subtraction is automatically calculated so that no intermediate setting of the weighing device 1 is required during the procedure.

Several lateral embodiments of the electronic weighing platform suspension are shown in FIGS. 8A, 8B and 8C, and are constructed of elastically rigid material. As embodied in FIG. 8A, weighing platform 7 is rigidly supported by platform brace 24a which is integral at both ends with laterally oriented support columns 25a. Support columns 25a are integral with base member 26. Strain gauges 27 are vertically mounted to columns 25a. Accordingly gauges 27 are mounted parallel to the gravitational field vector 28 at support columns 25a and consequently strain gauges 27 are subject to essentially pure elastic loading in tension.

As embodied in FIG. 8B, platform brace 24b is integral at both ends with support laterally oriented columns 25b. Support columns 25b are rigidly secured to base member 26b by standoffs 29. Strain gauges 27 are vertically mounted to columns 25b and consequently strain gauges 27 are subject to essentially pure elastic loading in tension.

As embodied in FIG. 8C, weighing platform brace 7 is integral with laterally oriented support columns 25c. Support columns 25c are rigidly secured to base member 26c by standoffs 29. Strain gauges 27 are vertically mounted to columns 25c and consequently strain gauges 27 are subject to essentially pure elastic loading in tension.

Several longitudinal embodiments of the electronic weighing platform suspension are shown in FIGS. 9A, 9B and 9C, and are constructed of elastically rigid material. As embodied in FIG. 9A, weighing platform 7 is rigidly supported by longitudinally oriented platform brace 34a which is integral at both ends with support columns 35a. Support columns 35a are integral with base member 36. Strain gauges 27 are vertically mounted to columns 35a. Accordingly gauges 27 are mounted parallel to the gravitational field vector 28 at support columns 35a and consequently strain gauges 27 are subject to essentially pure elastic loading in tension.

As embodied in FIG. 9B, platform brace 34b is integral at both ends with longitudinally oriented support columns 35b. Support columns 35b are rigidly secured to base member 36b by standoffs 39. Strain gauges 27 are vertically mounted to columns 35b and consequently strain gauges 27 are subject to essentially pure elastic loading in tension.

As embodied in FIG. 9C, weighing platform brace 7 is integral with longitudinally oriented support columns 35c. Support columns 35c are rigidly secured to base member 36c by standoffs 39. Strain gauges 27 are vertically mounted to columns 25c and consequently strain gauges 27 are subject to essentially pure elastic tension.

As embodied in FIGS. 8C and 9C, weighing platform 7 can be integral with several laterally oriented support columns 25c and with several longitudinally oriented support columns 35c.

Because the strain gauges 27 are mounted parallel to the gravitational field vector 28 and are accordingly not subject to cantilever or combined loads as in conventional scale suspension practice the strains to which strain gauges 27 are subject are linearly proportional to imposed load inasmuch as the imposed load is elastic and parallel to strain gauges 27 over the entire operating range of weighing device 1.

FIG. 10 shows the very low platform clearance possible utilizing the disclosed weighing platform assembly to minimize tilt error in wheelchair weighing.

Figure 11A:
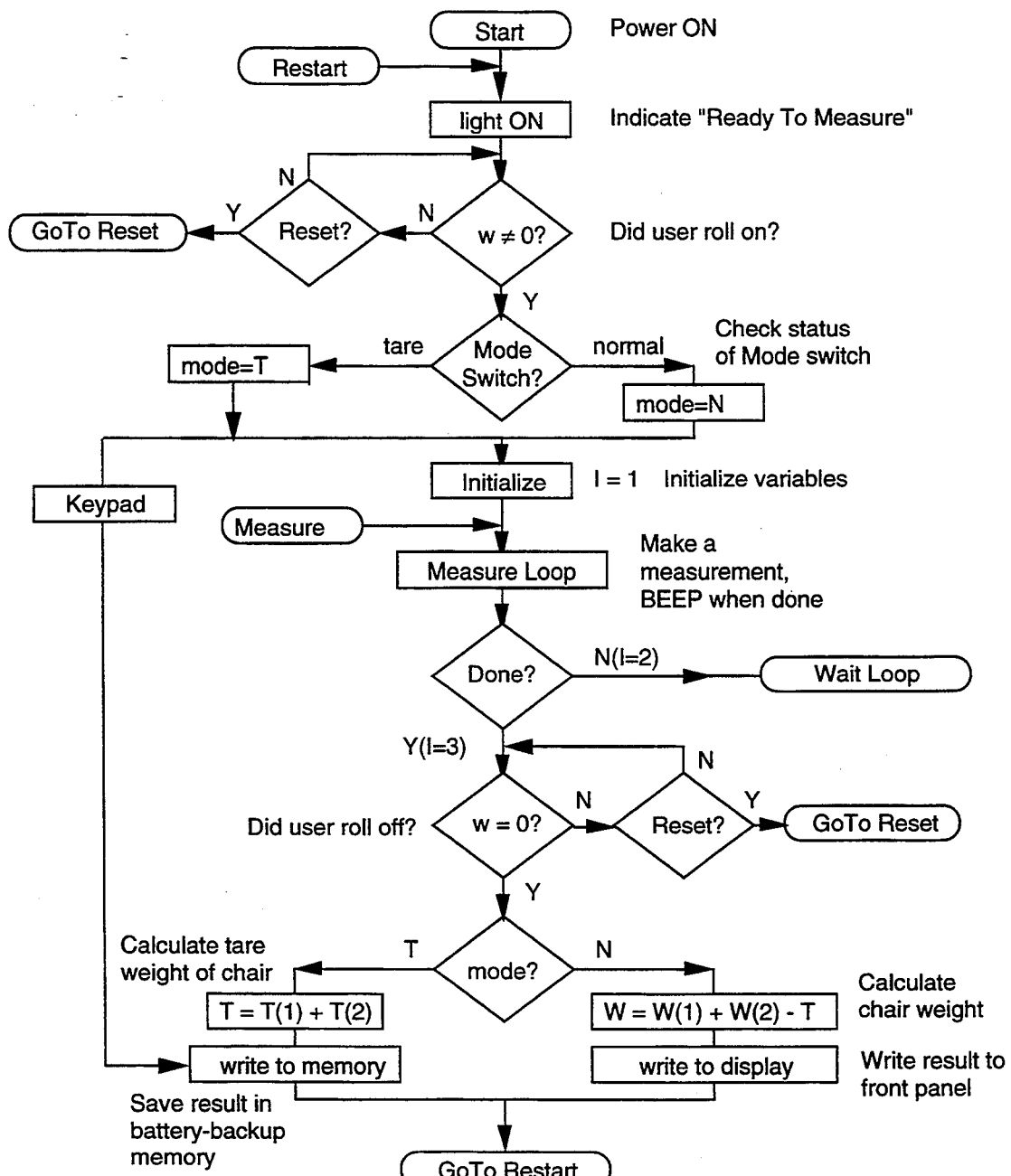
FIG. 11A illustrates the microprocessor major routine.

The microprocessor program required to record in proper sequence both the weight and tare and to display the correct weight reading is described in flow chart format which is both language and hardware independent. The program consists of a major routine and three subroutines. FIG. 11A illustrates the major routine, FIG. 11B the measure loop, FIG. 11C the wait loop; and FIG. 11D the reset loop. Several concerns have been addressed in this control scheme: continuous operation after powerup; user prompts for each measurement operation, user reset to cancel an incomplete or erroneous measurement, weight registering only after platform stabilization, and subtraction of tare, allowing deployment and operation by technician or occupant.

To eliminate any false readings that might occur while the caster wheels 13 and the main wheels 16 are in the process of rolling onto weighing platforms 7 the output signals from strain gauges 27 imposed by wheels 13 and 16 respectively will not register until several successive weight reading are within a preset limit.

While there have been described what is at present considered to be the preferred embodiment of the mobility-disabled weighing device, it will be obvious to those skilled in the art that various changes and modifications may be made therein without departing from the invention, and it is the objective therefore in the appended claims to cover all such changes and modifications as fall within the true spirit and scope of the invention.

What is claimed is:

1. A portable weighing device for the mobility-disabled comprising a pair of modules configured with weighing platforms and provided with
    a) mechanical means to slideably secure and rigidly align said modules, and
    b) electronic means to register, calculate and display weights;
        whereupon said modules are laterally displaced on an essentially level floor for determining the weight of an occupant of a manually-operated wheelchair, said wheelchair supported by two conventional front caster wheels and two conventional rear main wheels, said weighing platforms accommodating various treads and wheelbases of said caster and main wheels,
    said determination of said weight of said occupied wheelchair made in a sequence of steps comprising initially rolling said caster wheels onto said weighing platforms and subsequently rolling said main wheels onto said weighing platform, causing said wheelchair to tilt during both said steps, whereupon:
    a) initially the portion of said weight of said occupied wheelchair supported solely by said caster wheels is imposed on said weighing platform and registered by said electronic means, and
    b) subsequently the portion of said weight of said occupied wheelchair supported solely by said main wheels is imposed on said weighing platform and registered by said electronic means;
        whereby weight of said occupant, compensated for variations in said tread, wheelbase and tilt of said wheelchair, is calculated from said weight of said occupied wheelchair by said electronic means from said sequence of steps and shown on said display.

2. A portable weighing device according to claim 1 wherein said mechanical means to slideably secure and rigidly align said modules are provided by a slider and a pivot arrangement comprising lateral slide rods and a pivot;
    whereby said modules can be either deployed for weighing by extension of said slider and said pivot or folded and secured together for carriage or storage by retraction of said slider and said pivot.

3. A portable weighing device according to claim 1 wherein said electronic means comprises a microprocessor and memory to register/said weights from said weighing platforms, calculate said weight of said occupant of said wheelchair and display said weight of said occupant.

4. A portable weighing device according to claim 3 wherein said weight of said wheelchair comprises the tare weight, said tare registered by either
    a) rolling said wheelchair over said weighing device to successively register the weight supported by said caster wheels and said main wheels of said wheelchair, or b) keying the known weight of said unoccupied wheelchair into said weighing device by a keypad;

whereupon said tare weigh is held in said memory of said electronic means then subtracted from said weight of said occupied wheelchair whereby said weight of said occupant of said wheelchair is displayed.

5. A portable weighing device according to claim 4 whereupon operation of said weighing device is continuous after power up, wherein user prompts are provided by said electronic means for each measurement operation;

user reset is provided to cancel an incomplete or erroneous measurement;

weight registration occurs only after platform stabilization; and subtraction of said tare is automatic;

whereby said weighing device can be deployed and operated by an ordinary technician or by occupants of said wheelchairs.

6. An essentially rectangular weighing platform suspension for a portable weighing device according to claim 1 comprising said weighing platforms and a plurality of support columns, mounted essentially vertically on each said support columns strain measuring devices essentially parallel to the gravitational vector, wherein said strain measuring devices are subject to essentially pure tension loads when said weighing platform is subjected to an imposed load whereby the sum of said strains to which said strain measuring devices are subject is linearly proportional to said imposed load and is consequently independent of the lateral position of said imposed load on said weighing platform, thereby accommodating variations in said wheel tread of said wheelchairs.

7. A weighing platform suspension according to claim 6 wherein said support columns are located at the corners of said weighing platform, permitting a low platform height and thereby minimizing weighing errors arising from wheelchair tilt.

8. A weighing platform suspension according to claim 6 wherein said plurality of support columns include said columns that are either laterally oriented, longitudinally oriented or both laterally and longitudinally oriented.

9. A weighing platform suspension according to claim 6 wherein said strain measuring devices comprise strain gauges, thereby providing strain measurements parallel to the gravitational vector.

10. A weighing platform suspension according to claim 9 wherein said weighing platform is rigidly secured to a platform brace member, said brace member integral with said support columns, thereby providing suspension for said weighing platform.

11. A weighing platform suspension according to claim 9 wherein said weighing platform is integral with said support columns, thereby providing suspension for said weighing platform.

12. A weighing platform suspension according to claim 6 wherein said weighing platform is essentially concave, minimizing height of said weighing platforms and thereby minimizing weighing errors arising from wheelchair tilt.

* * * * *